(12) United States Patent
Chen et al.

(10) Patent No.: US 10,485,114 B2
(45) Date of Patent: Nov. 19, 2019

(54) ENGAGING STRUCTURE AND DISPLAY DEVICE HAVING THE SAME

(71) Applicant: Innolux Corporation, Miao-Li County (TW)

(72) Inventors: Szu-Yin Chen, Miao-Li County (TW); Chih-Hung Hsu, Miao-Li County (TW); Chin-Tu Tsai, Miao-Li County (TW); I-Han Liu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/993,734

(22) Filed: May 31, 2018

(65) Prior Publication Data

US 2019/0008055 A1   Jan. 3, 2019

(30) Foreign Application Priority Data

Jun. 29, 2017 (CN) .......................... 2017 1 0514750

(51) Int. Cl.
*H05K 5/00* (2006.01)
*G02F 1/1333* (2006.01)

(52) U.S. Cl.
CPC ..... *H05K 5/0017* (2013.01); *G02F 1/133308* (2013.01); *G02F 2001/13332* (2013.01); *G02F 2001/133314* (2013.01); *G02F 2201/46* (2013.01); *G02F 2201/465* (2013.01)

(58) Field of Classification Search
CPC ... G02F 1/133308; G02F 2001/133314; G02F 1/133608; G02F 2001/133317; G02F 2001/13332; G02F 2201/46; G02F 2001/133325; G02F 2001/133328; G02F 2201/465; G02B 6/0093; H05K 7/1427; H05K 5/0047; H05K 5/03; H05K 5/0017
See application file for complete search history.

(56) References Cited

U.S. PATENT DOCUMENTS

| 8,861,190 | B2 * | 10/2014 | Kim | .................. | G02F 1/133308 |
| | | | | | 349/58 |
| 2007/0201195 | A1 * | 8/2007 | Saiki | ..................... | G06F 1/1626 |
| | | | | | 361/679.02 |

* cited by examiner

*Primary Examiner* — James Wu
*Assistant Examiner* — Hung Q Dang
(74) *Attorney, Agent, or Firm* — McClure, Qualey & Rodack, LLP (57) ABSTRACT

A display device is provided, comprising a display panel, a backlight module and a housing. The display panel and the backlight module are disposed in the housing. The housing includes a frame, a rear plate and a plurality of assembling modules for assembling the frame and the rear plate. One of the assembling modules includes an engaging structure disposed on the frame and an accommodating hole. The engaging structure includes a base, a first positioning element and a second positioning element, wherein the first positioning element and the second positioning element are disposed on the base. The accommodating hole is disposed at the sides of the rear plate and corresponding to the second positioning element of the engaging structure.

19 Claims, 9 Drawing Sheets

ENGAGING STRUCTURE AND DISPLAY
DEVICE HAVING THE SAME

This application claims the benefit of People's Republic of China application Serial No. 201710514750.4, filed Jun. 29, 2017, the subject matters of which is incorporated herein by references.

BACKGROUND

Technical Field

The disclosure relates to an engaging structure and a display device having the same, and more particularly to a display device with the screw-free assembling modules.

Description of the Related Art

Display device, an electronic product with a display panel such as smart phones, tablets, notebooks, monitors, and TVs, have become indispensable necessities to modern people no matter in their work, study or entertainment. With a flourishing development of the portable electronic products, the consumers not only pursue better electronic characteristics such as higher display quality, higher speed of response, longer life span and higher reliability, but also have higher expects on the functions of the products to be more diversified. Moreover, it is an important matter to the consumers whether the display device presents good appearance.

In a typical display device, the front frame of the module mostly has a side-locking screw structure or a back-locking screw structure, which not only increases the assembly time and disassembly time, but also increases the overall thickness of the display device.

SUMMARY

The disclosure relates to an engaging structure and a display device having the same, wherein the engaging structures could reduce the difficulties of assembly and disassembly of a frame and a rear plate.

According to one embodiment of the present disclosure, a display device is provided, comprising a display panel, a backlight module and a housing. The display panel and the backlight module are disposed in the housing. The housing includes a frame, a rear plate and a plurality of assembling modules for assembling the frame and the rear plate. One of the assembling modules includes an engaging structure disposed on the frame and an accommodating hole. The engaging structure includes a base, a first positioning element (such as a tongue plate) and a second positioning element (such as a hook), wherein the first positioning element and the second positioning element are disposed on the base. The accommodating hole is disposed at the sides of the rear plate and corresponding to the second positioning element of the engaging structure.

According to one embodiment of the present disclosure, an engaging structure is provided, comprising a base, a first positioning element connecting to the base; and a second positioning element connecting to the base, wherein the first positioning element comprises a connecting portion, a baffle portion and a guiding portion, two ends of the connecting portion respectively connect the base and the baffle portion, and two ends of the baffle portion respectively connect the connecting portion and the guiding portion.

The disclosure will become apparent from the following detailed description of the preferred but non-limiting embodiments. The following description is made with reference to the accompanying drawings.

DETAILED DESCRIPTION

In the embodiments of the present disclosure, a display device is provided by adopting an engaging structure disposed on the frame without affecting appearance of the frame. Also, the engaging structure is fixed to the rear plate via an engaging method, and thus, no conventional screwing method is required. Therefore, the engaging structure possesses engaging function and the display device applied with the engaging structure of the embodiment also presents the good appearance. Moreover, in one embodiment, a guiding structure is disposed to reduce the difficulty during the assembly of a frame and a rear plate. Also, the design of the embodiment facilitates the detachment of the frame from the rear plate during product inspection or maintenance.

The embodiments are described in details with reference to the accompanying drawings. It is noted that the details of the structures of the embodiments are provided for exemplification, and the described details of the embodiments are not intended to limit the present disclosure. It is noted that not all embodiments of the invention are shown. Modifications and variations can be made without departing from the spirit of the disclosure to meet the requirements of the practical applications. Thus, there may be other embodiments of the present disclosure which are not specifically illustrated. Further, the accompany drawings are simplified for clear illustrations of the embodiment; sizes and proportions in the drawings are not directly proportional to actual products, and shall not be construed as limitations to the present disclosure. Thus, the specification and the drawings are to be regard as an illustrative sense rather than a restrictive sense. Also, the identical and/or similar elements of the embodiments are designated with the same and/or similar reference numerals.

Moreover, use of ordinal terms such as "first", "second", "third", etc., in the specification and claims to modify an element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
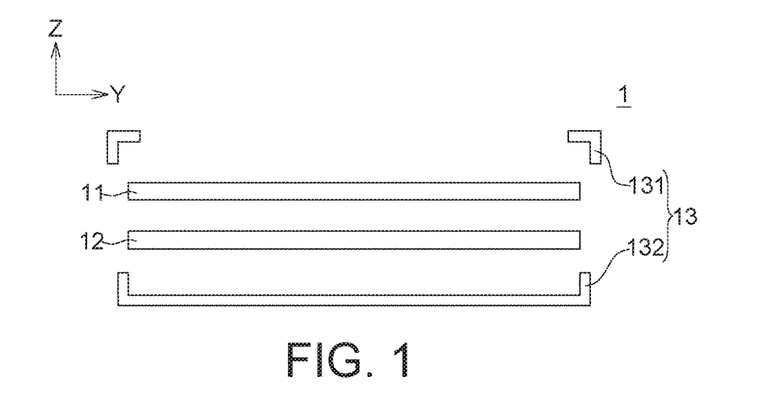
FIG. 1 is a cross-sectional view for simply depicting a display device according to one embodiment of the disclosure.

FIG. 1 is a cross-sectional view for simply depicting a display device according to one embodiment of the disclosure. In one embodiment, a display device 1 includes a display panel 11, a backlight module 12 and a housing 13. The display panel and the backlight module are disposed in the housing 13, and the housing 13 includes a frame 131 (e.g. a front frame), a rear plate 132 and several assembling modules (depicted in FIG. 2) for assembling the frame 131 and the rear plate 132. During assembly, the backlight module 12 is disposed on the rear plate 132, and the display panel 11 is positioned on the backlight module 12; afterwards, the frame 131 is assembled with the rear plate 132, wherein the frame 131 surrounds the peripheries of a displaying surface of the display panel 11 after assembly, and this type of the frame 131 is also known as a front frame. It is noted that the frame 131 can be configured in many different types. Although an L-shaped frame (e.g. a cross-sectional shape of the frame in FIG. 1) is illustrated as the frame 131, the disclosure is not limited thereto. Any frame capable of fixing and assembling the related modules can be applied in the embodiment of the disclosure.

Figure 2:
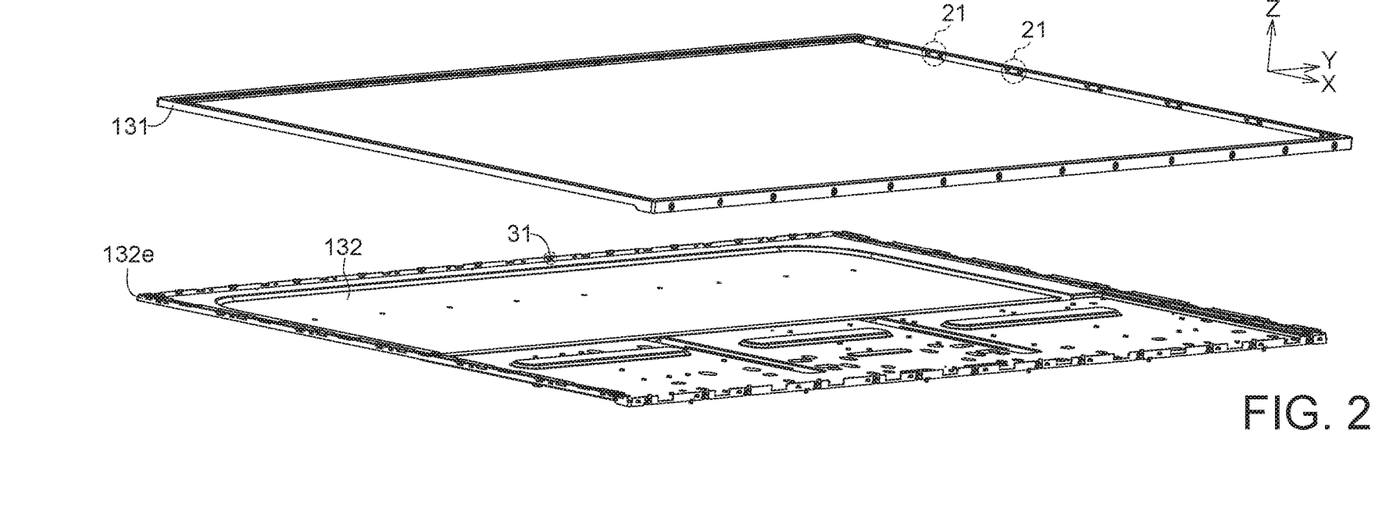
FIG. 2 depicts a frame detached from a rear plate of a display device according to one embodiment of the disclosure.
Figure 5A:
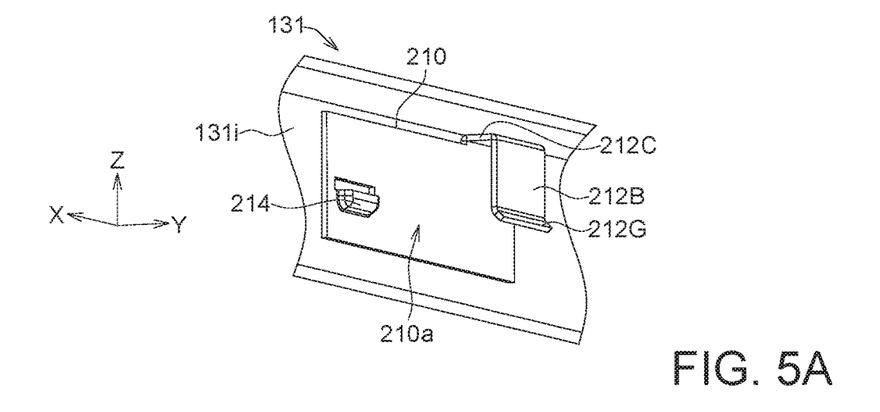
FIG. 5A and FIG. 5B schematically show an engaging structure disposed at the frame of a display device according to one embodiment of the disclosure.
Figure 5B:
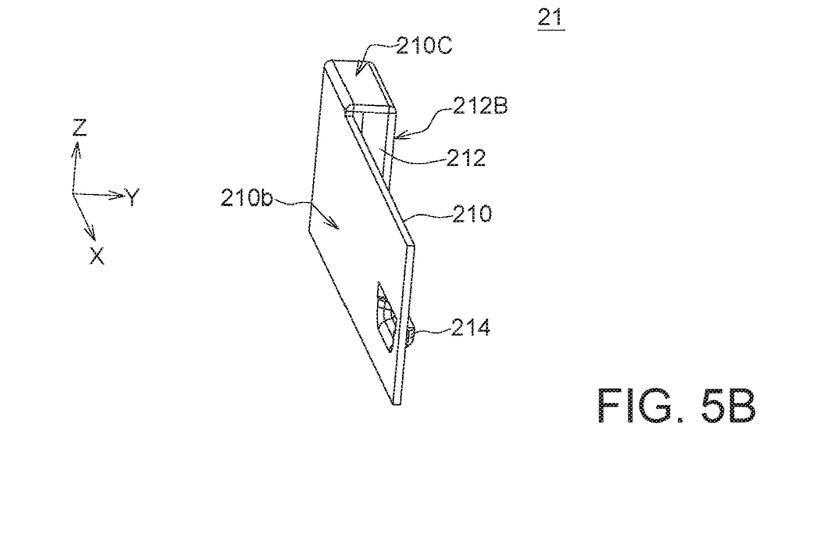

FIG. 2 depicts a frame detached from a rear plate of a display device according to one embodiment of the disclosure. Take one of the assembling modules as an example for illustration. In one embodiment, one assembling module includes an engaging structure 21 and an accommodating hole 31. The engaging structure 21 is disposed at an interior side of the frame 131 which faces towards the display panel 11. According to the embodiment, an engaging structure at least comprises a base, a first positioning element and a second positioning element, wherein the first positioning element and the second positioning element are disposed on the base. Practically, the first positioning element and the second positioning element could be a tongue plate, a hook, or any elements able to engage each other, so that the first positioning element and the second positioning element as formed therein are used to position the frame and the rear plate at two different directions. In one but not limited example as illustrated below, the engaging structure at least comprises a tongue plate 212 as the first positioning element and a hook 214 as the second positioning element, as shown in FIG. 5A and FIG. 5B. The accommodating hole 31 is disposed at a side 132e of the rear plate 132, and the accommodating hole 31 is disposed correspondingly to the hook 214. According to the embodiment, several assembling modules can be disposed and distributed on at least one of four lateral sides of the housing; for example, at least one engaging structure 21 is disposed at a longer lateral side or a shorter lateral side of the frame 131, and at least one accommodating hole 31 is disposed at a side 132e (e.g. a longer side or a short side) of the rear plate 132, wherein the accommodating hole 31 is disposed correspondingly to the engaging structure 21.

Figure 3:
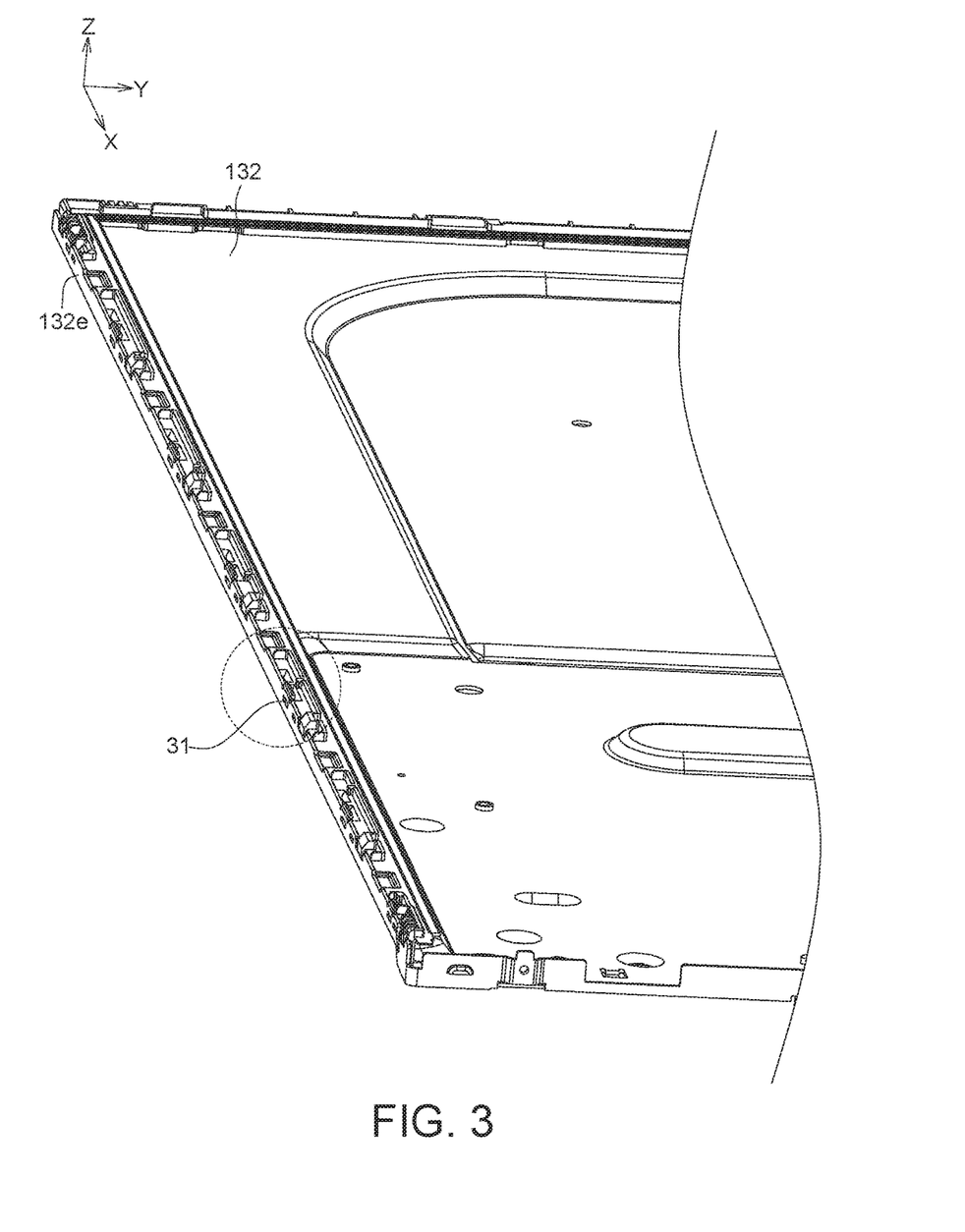
FIG. 3 is an enlarging drawing depicting parts of the rear plate in FIG. 2.
Figure 4:
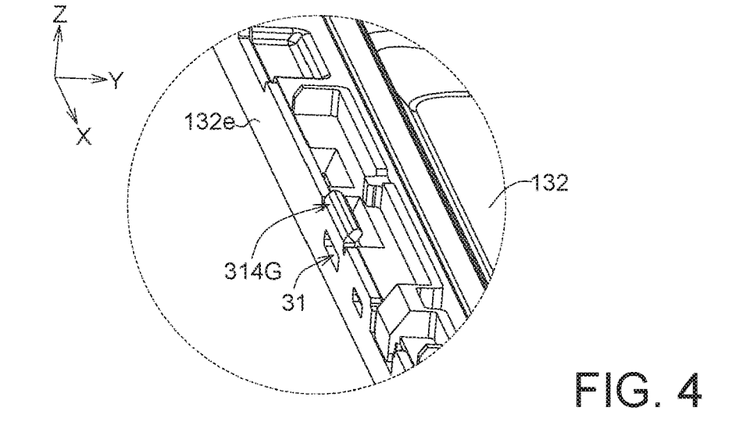
FIG. 4 is an enlarging drawing of the circled portion of the rear plate in FIG. 3, which shows the accommodating hole at the side of the rear plate and a guiding structure positioned above the accommodating hole.
Figure 6:
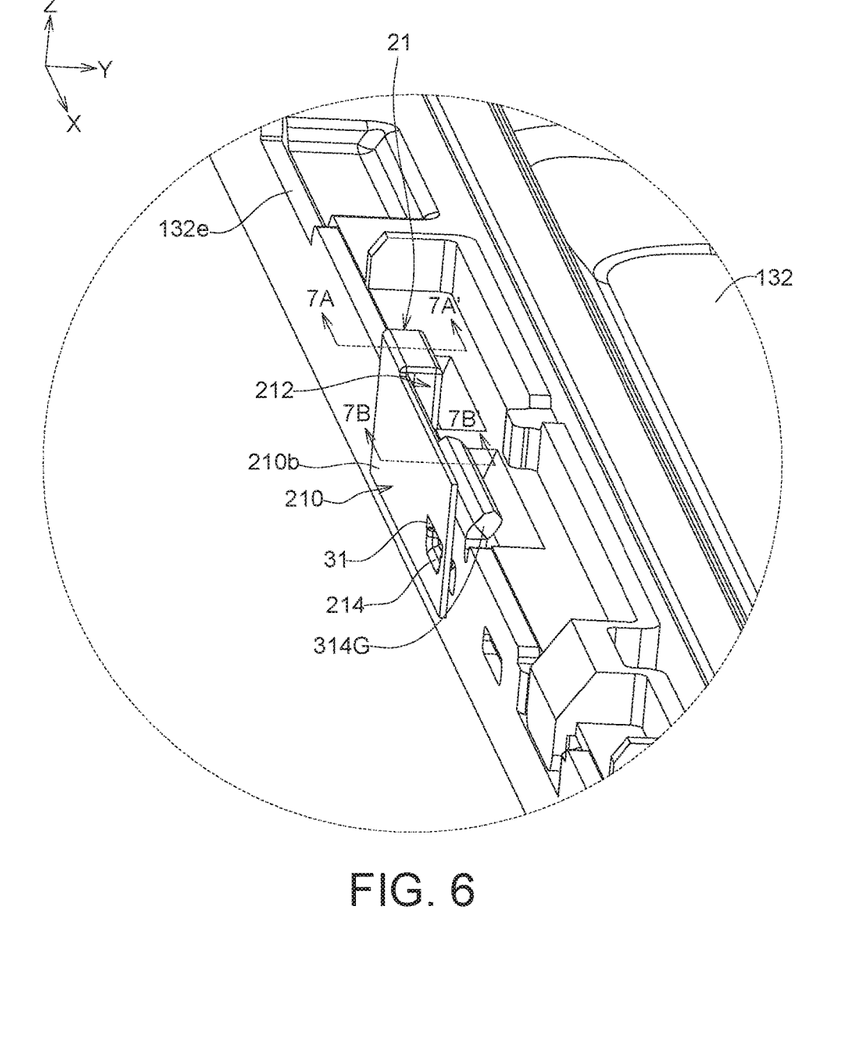
FIG. 6 depicts the engaging structure of FIG. 5A-FIG. 5B and the accommodating hole at the side of the rear plate of FIG. 4 after assembly.

FIG. 3 is an enlarging drawing depicting parts of the rear plate in FIG. 2. FIG. 4 is an enlarging drawing of the circled portion of the rear plate in FIG. 3, which shows the accommodating hole 31 at the side of the rear plate and a guiding structure 314G positioned above the accommodating hole 31. FIG. 5A and FIG. 5B schematically show an engaging structure disposed at the frame of a display device according to one embodiment of the disclosure. Please see FIG. 4, FIG. 5A and FIG. 5B. In the engaging structure of the embodiment, besides the second positioning element such as (but not limited to) the hook 214 for engagement and the first positioning element such as (but not limited to) the tongue plate 212 for preventing the structure turning outward along the Y-direction (FIG. 4), one end of the tongue plate 212 also has a folding structure (such as a guiding portion 212G) for guiding the frame 131 to be assembled with the rear plate 132. As shown in FIG. 5A and FIG. 5B, the engaging structure 21 includes a base 210, a tongue plate 212 (e.g. the first positioning element) and a hook 214 (e.g. the second positioning element). The first positioning element such as the tongue plate 212 comprises a connecting portion 212C, a baffle portion 212B and a guiding portion 212G, wherein the hook 214 and the connecting portion 212C are protruded from a surface of the base 210, such as protruded from the first surface 210a of the base 210 (FIG. 5A). The second surface 210b of the base 210 (FIG. 5B) is close to and fixed at the inner surface 131i of the frame 131 (FIG. 5A). The second surface 210b of the base 210 can be directly connected to the frame 131, such as directly contacts the frame 131; or the second surface 210b can be indirectly connected to the frame 131 through adhesive or other connecting elements. Two ends of the connecting portion 212C respectively connect the baffle portion 212B and the base 210 (e.g. connect the first surface 210a of the base 210), and the connecting portion 212C is vertical to the base 210. Also, two ends of the baffle portion 212B respectively connect the connecting portion 212C and the guiding portion 212G. In practical application, the guiding portion 212G is in parallel to the base 210 substantially (e.g. the angle between the connecting portion 212C and the baffle portion 212B is about 90 degree), as shown in FIG. 5A and FIG. 5B. Also, the angle between the connecting portion 212C and the baffle portion 212B can be non-90 degrees, as long as it would not affect the assembly and disassembly between the tongue plate 212 and the side 132e of the rear plate 132. The guiding portion 212G connects one end of the baffle portion 212B (i.e. the end of the tongue plate 212), wherein a first angle exists between the guiding portion 212G and an extending plane of the baffle portion 212B, and the guiding portion 212G is designed for guiding the frame 131 to be assembled with the rear plate 132. FIG. 4 shows the accommodating hole 31 at the side of the rear plate, and the guiding structure 314G positioned above the accommodating hole 31. During assembly of the frame 131 and the rear plate 132, an opening of the tongue plate 212 faces the rear plate 132, and the tongue plate 212 above the side 132e of the rear plate 132 is moved downwardly and along the Z-direction to cover the side 132e of the rear plate 132; also, the hook 214 of the engaging structure 21 is moved along the guiding structure 314G and glided downwardly until it inserts into the accommodating hole 31. The opening of the tongue plate 212, as described herein, is an accommodating space created by the base 210, the connecting portion 212C and the baffle portion 212B, wherein the accommodating space referred as "an opening". FIG. 6 depicts the engaging structure of FIG. 5A-FIG. 5B and the accommodating hole at the side of the rear plate of FIG. 4 after assembly.

After assembly of the engaging structure 21 and the accommodating hole 31 at the side 132e of the rear plate 132 is completed, the first positioning element such as the tongue plate 212 covers the side 132e of the rear plate 132, thereby restricting the displacement between the frame 131 and the rear plate 132 in the Y-direction (i.e. fixation at the Y-direction), and preventing the frame 131 turning outwardly along the Y-direction. In one example, as depicted in FIGS. 2, 3 and 6, several assembling modules of the housing are disposed on at least one of four lateral sides of the frame 131 separately; for example, at least one engaging structure 21 is disposed at a longer lateral side or a shorter lateral side of the frame 131. As shown in FIG. 2, if the longer lateral side of frame 131 is parallel to the Y-direction and an engaging structure 21 is disposed thereon, the second positioning element such as the hook 214 inserting into the accommodating hole 31 can restrict not only the movement of the frame 131 along the Z-direction, but also the movement of the movement of the frame 131 along the Y-direction. Moreover, the first positioning element such as the tongue plate 212 covering the side 132e of the rear plate 132 can restrict the movement of the frame 131 along the X-direction (please refer to FIG. 4-FIG. 6 for the structural details of the hook 214, the tongue plate 212 and the accommodating hole 31). Similarly, in the drawings of the embodiment (e.g, as depicted in FIGS. 2, 3 and 6), if the shorter lateral side of frame 131 is parallel to the X-direction and an engaging structure 21 is disposed thereon, the second positioning element such as the hook 214 inserting into the accommodating hole 31 can restrict not only the movement of the frame 131 along the Z-direction, but also the movement of the movement of the frame 131 along the X-direction; moreover, the tongue plate 212 covering the side 132e of the rear plate 132 can restrict the movement of the frame 131 along the Y-direction.

Accordingly, if it is only the hook 214 inserted into the accommodating hole 31 for engagement, the frame 131 would be separated (e.g. turned outward) from the rear plate 132 easily. According to the embodiment, a design in which the first positioning element such as the tongue plate 212 and the second positioning element such as the hooks 214 interfere with each other is provided; this design not only secures the assembly of the frame 131 and the rear plate 132, but also prevents the frame 131 separating (e.g. turning outward) from the rear plate 132. Although the tongue plate 212 and the hooks 214 are respectively exemplified as the first and second positioning elements, the present disclosure is not limited thereto. The first and second positioning elements of the embodiment could be a hook and a tongue plate, respectively. Also, the first and second positioning elements of the embodiment could be any elements having positioning functions, as long as the first and second positioning elements are capable of engaging to each other and restrict the movements of the frame along the Z-direction, the X-direction and the Y-direction.

It is noted that the number of the engaging structures 21 is determined according to the conditions of the practical applications, such as the size of the display panel, the materials of the frame and the engaging structures, the weight carried by the housing (i.e. the weight of the display panel and the weight of the backlight module), the disclosure has no limitation thereto. Take an embodiment of 50-inch (e.g. 50") displayer for exemplification, 8 to 10 of engaging structures are (but not limitedly) disposed at the longer lateral side of frame 131, while 5 to 6 of engaging structures are (but not limitedly) disposed at the shorter lateral side of frame 131. In one embodiment, the pitch between adjacent engaging structures 21 is (but not limitedly) in a range equal to or greater than 50 mm to equal to or less than 200 mm. The pitches between adjacent engaging structures 21 are determined depending on the conditions of the practical applications, such as the pitches would be different since the mechanical components of the assembly have their own shapes. In the practical applications, the number and positions of the engaging structures 21 disposed at the frame 131 are not limited as long as the frame 131 and the rear plate 132 can be assembled steadily though those engaging structures 21.

Figure 7A:
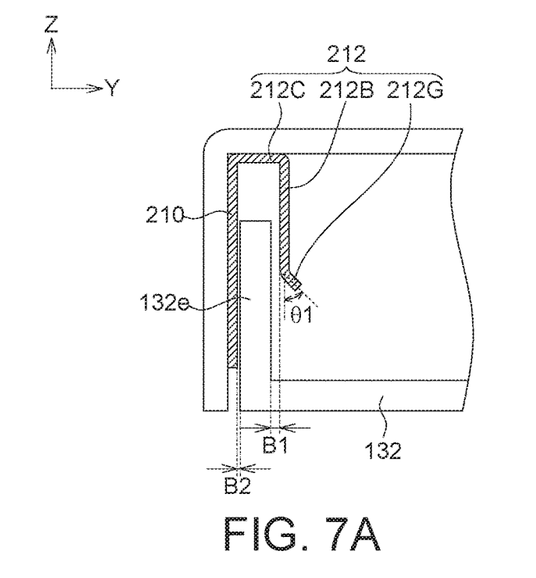
FIG. 7A is a cross-sectional view of the tongue plate assembled with the rear plate along the cross-sectional line 7A-7A' of FIG. 6.
Figure 7B:
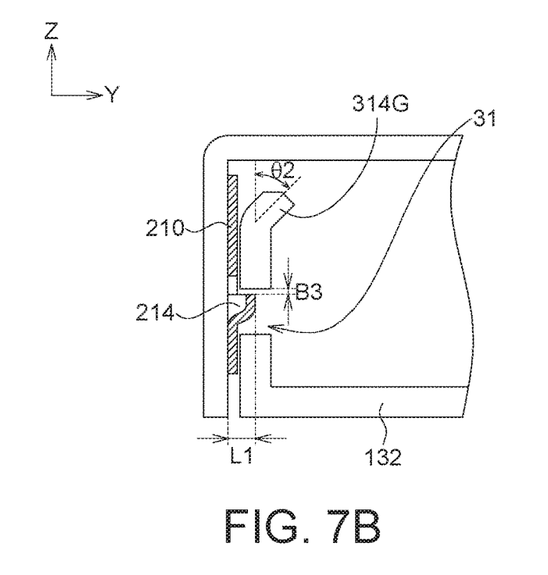
FIG. 7B is a cross-sectional view of the hook inserted into the accommodating hole of the rear plate along the cross-sectional line 7B-7B' of FIG. 6.

FIG. 7A is a cross-sectional view of the tongue plate assembled with the rear plate along the cross-sectional line 7A-7A' of FIG. 6. FIG. 7B is a cross-sectional view of the hook inserted into the accommodating hole of the rear plate along the cross-sectional line 7B-7B' of FIG. 6. Methods of assembly and disassembly of the frame and the rear plate according to one embodiment are exemplified below for illustration. Please refer to FIG. 7A and FIG. 7B.

According to one embodiment, one end of the tongue plate 212 has a guiding portion 212G, as shown in FIG. 7A. The guiding portion 212G bends away from the base 210 with a first angle $\theta 1$. When the frame 131 is assembled with the rear plate 132, the guiding portion 212G is able to guide the engagement between the opening of the tongue plate 212 and the side 132e of the rear plate 132. Additionally, when it has a need to disassemble the frame 131 and the rear plate 132, the guiding portion 212G provides a larger space for moving the side 132e of the rear plate 132 inside the tongue plate 212, so that the hook 214 can be moved away from the accommodating hole 31; thus, the guiding portion 212G facilitates the tongue plate 212 to separate from the side of the rear plate. In one embodiment, the first angle $\theta 1$ is (but not limited) in a range from 20 degrees to 45 degrees ($20° \leq \theta 1 \leq 45°$).

Moreover, since the tongue plate 212 covers the side 132e of the rear plate 132 after assembly; that is, the opening of the tongue plate 212 faces the rear plate 132, and the tongue plate 212 fully covers part of the side of the rear plate, wherein the part of the side of the rear plate is contained within the opening of the tongue plate 212 (please see FIG. 7A). In one embodiment, considering disassembly, the opening of the tongue plate 212 is apart from the side of the rear plate rather than completely pressing against the rear plate 132. For example, the spaces (labelled as the distances B1 and B2) exist between two opposite surfaces of the side of the rear plate and the inner sidewalls of the tongue plate 212, thereby facilitating the disassembly of the frame. In one embodiment, each of the distances B1 and B2 can be in a range of equal to or greater than 0.01 mm to equal to or less than 5 mm. In another embodiment, the distances B1 and B2 are not identical to each other (i.e. B1≠B2).

Additionally, a guiding structure 314G (FIG. 4) is further configured at the side 132e of the rear plate 132, and positioned above the accommodating hole 31 correspondingly. As shown in FIG. 7B, a guiding angle $\theta 2$ exists between the guiding structure 314G and an extending plane of the side 132e of the rear plate 132, wherein the guiding structure 314G bends away from the hook 214. When the frame 131 is assembled with the rear plate 132, the guiding structure 314G facilitates the assembly by moving the hook 214 of the engaging structure 21 downwardly along the guiding structure 314G (e.g. glided downwardly at the outer wall of the side 132e of the rear plate 132) until the hook 214 inserts into the accommodating hole 31. In one embodiment, the guiding angle $\theta 2$ of the guiding structure 314G is in a range from 30 degrees to 45 degrees (30°≤θ2≤45°), but the disclosure is not limited thereto.

Accordingly, after assembly of the frame 131 and the rear plate 132 is completed, the hook 214 is inserted into the accommodating hole 31, thereby restricting the movement of the frame 131 in the Z-direction (i.e. fixation at the Z-direction), as shown in FIG. 7A.

Figure 8A:
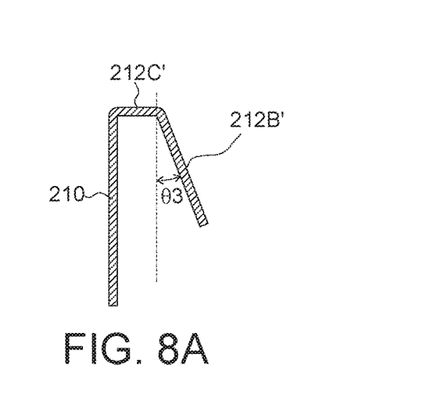
FIG. 8A-FIG. 8C depict three of the applicable types of the tongue plate.
Figure 8B:
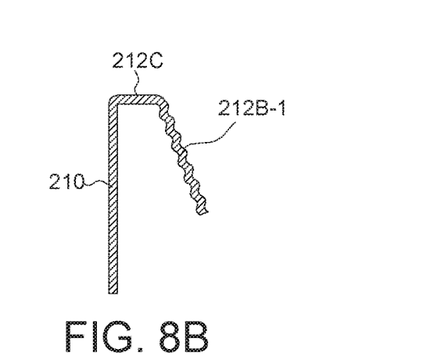
Figure 8C:
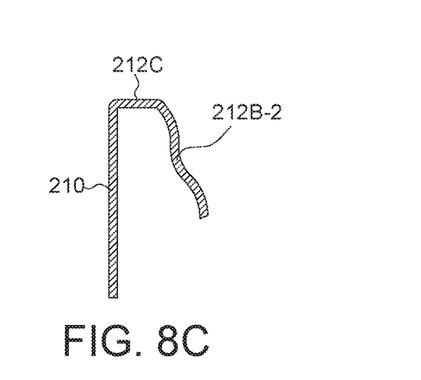
Figure 9A:
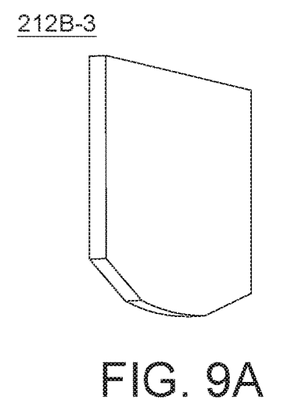
FIG. 9A-FIG. 9D depict other applicable types of the baffle portions of the tongue plate.
Figure 9B:
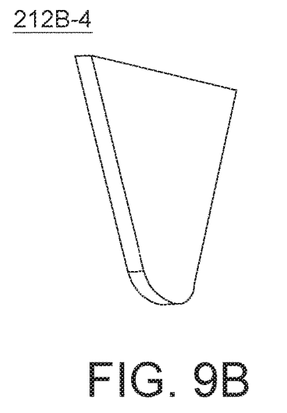
Figure 9C:
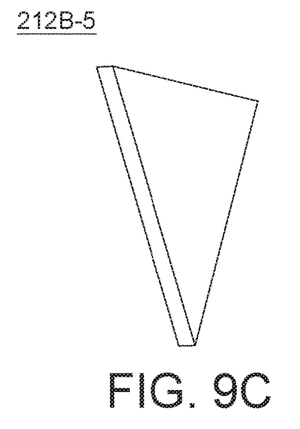
Figure 9D:
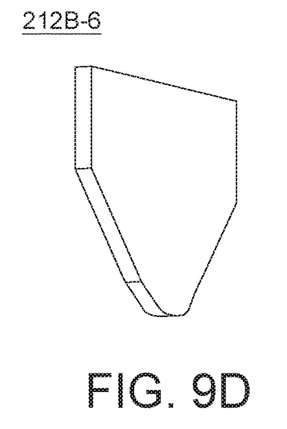

According to the exemplified engaging structure depicted in FIG. 7A, the baffle portion 212B of the tongue plate 212 is perpendicular to the connecting portion 212C, and the baffle portion 212B has a smooth surface. However, the disclosure is not limited to the type of the tongue plate as exemplified in FIG. 7A. FIG. 8A-FIG. 8C depict three of the applicable types of the tongue plate. In an exemplified embodiment, an angle of (60+θ3) exists between the baffle portion 212B' of the tongue plate 212 and the connecting portion 212C' (θ3 labeled in FIG. 8A); that is, an angle between the baffle portion 212B' and the connecting portion 212C' can be 60 degrees or more, increasing the angle θ3 in the direction away from the base 210. In one embodiment, the angle θ3 is (but not limited) in a range from 5 degrees to 100 degrees (5°≤θ3≤100°); that is, an angle between the baffle portion 212B' and the connecting portion 212C' can be in a range from 65 degrees to 160 degrees. In another embodiment, the angle θ3 is (but not limited) in a range from 5 degrees to equal to 25 degrees (5°≤θ3≤25°); that is, an angle between the baffle portion 212B' and the connecting portion 212C' can be in a range from 65 degrees to 85 degrees, wherein this θ3 range does increase the interference between the tongue plate 212 and the side 132e of the rear plate 132 so as to fix the assembling module more stably, but this range would make the disassembly of the assembling module more difficult. In still another embodiment, the angle θ3 is (but not limited) in a range from 35 degrees to 100 degrees (35°≤θ3≤100°); that is, an angle between the baffle portion 212B' and the connecting portion 212C' can be in a range from 95 degrees to 160 degrees, wherein this range decreases the interference between the tongue plate 212 and the side 132e of the rear plate 132 so as to reduce the engagement extent of the assembling module, and the disassembly of the assembling module this range would become easier in this θ3 range. Moreover, the surface of the baffle portion 212B can be smooth or rough, the disclosure has no limitation thereto; for example, the surface of the baffle portion 212B may include several folds such as diamond folds (e.g. the baffle portion 212B-1 as shown in FIG. 8B), or include several waves (e.g. the baffle portion 212B-2 as shown in FIG. 8C).

Additionally, there is no particular limitation to the shape of the tongue plate 212. For example, the baffle portion may have rectangular (or square) shape, or other shapes. As shown in FIG. 9A-FIG. 9D, the baffle portions 212B-3 to 212B-6 have the surfaces in the shapes of polygon, tetragon, triangle, etc., wherein the end of each of the baffle portions can also has a guiding structure (similar to the guiding portion 212G in FIG. 7A). Any types of the tongue plate can be applied in the disclosure as long as it can be well assembled to the rear plate 132 to prevent the frame turning outwardly.

Figure 10A:
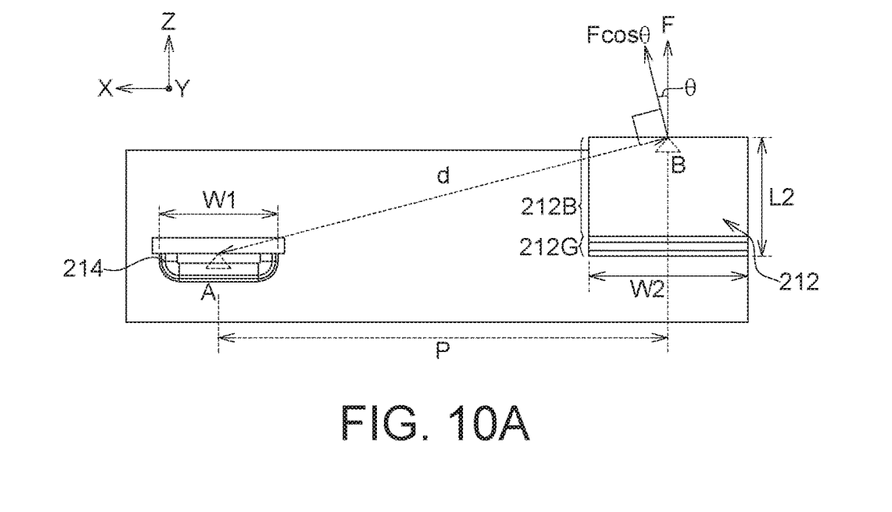
FIG. 10A and FIG. 10B are front views of an engaging structure according to an embodiment.
Figure 10B:
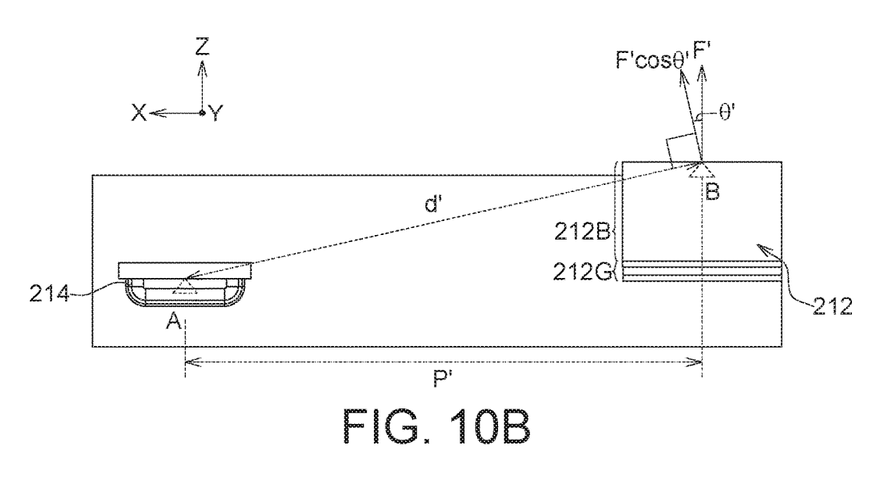
Figure 11:
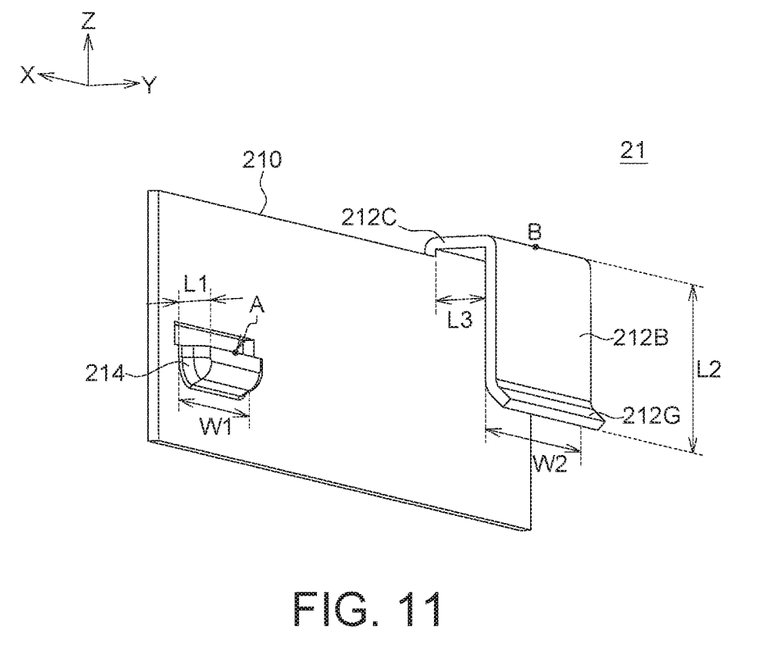
FIG. 11 is a perspective view illustrating an engaging structure according to an embodiment.

Moreover, according to the assembling modules of the embodiment, each of the engaging structures 21 has an adequate distance between the first positioning element (such as the tongue plate 212) and the second positioning element (such as the hooks 214) to facilitate the assembly and disassembly. For example, the larger the distance between the tongue plate 212 and the hooks 214 interfered with each other, the less force required for removing the frame 131. The details are exemplified below. FIG. 10A and FIG. 10B are front views of an engaging structure according to an embodiment. FIG. 11 is a perspective view illustrating an engaging structure according to an embodiment. Please refer to FIG. 10A and FIG. 10B. One applicable disassembly method is described below. During disassembly, the frame is pulled toward the Z-direction; that is, an upward force F exerts on the frame to move the tongue plate 212 (e.g. the first positioning element) upwardly along the Z-direction. Meanwhile, the hook 214 (e.g. the second positioning element) in the accommodating hole functions as a fulcrum, and a torque is created by pivoting an object (i.e. the engaging structure 21) on an axle (i.e. the hook 214). In FIG. 10A and FIG. 10B, it is assumed that the center points of the hook 214 and the tongue plate 212 are points A and B, respectively (e.g. in this exemplification, a center point of the connection between the baffle portion 212B and the connecting portion 212C is determined as the center point of the tongue plate 212; please also see FIG. 11). In FIG. 10A, the distance between the points A and B is d, and an upward force F exerting on the frame is the force F. In FIG. 10B, the distance between the points A and B is d', and an upward force F exerting on the frame is the force F'. As shown in FIG. 10A and FIG. 10B, the hook 214 functions as an axle, and the torques (i.e. given by the cross product of the position vector (distance vector) and the force vector) are F cos θ×d and F' cos θ'×d', respectively. Because θ is approximate to θ', the values of cos θ and cos θ' can be negligible. If the same torque is generated (i.e. F×d=F'×d'), when d' is larger than d, F' smaller than F can achieve the same pivoting effect. Thus, the larger the distance between the tongue plate 212 and the hooks 214, the less force required for disassembly. In one embodiment, a distance P (i.e. the shortest distance between the vertical projection of the points A and B on the XY-plane), as shown in FIG. 10A and FIG. 10B, is in a range from 15 mm to 70 mm (15 mm≤P≤70 mm). Also, since the size of the engaging structure is very small, the distances d and d' between the points A and B are approximate to the distances P and P', respectively. That is, P is approximate to d, and P' is approximate to d'. In one embodiment, the distance d is in a range from 15 mm to 70 mm (15 mm≤d≤70 mm). It is, of course, that the distance between the tongue plate and the hooks (e.g., d/d' and P/P') can be adjusted depending on the difficulty of assembly/disassembly and the overall strength of the engaging structure in the practical application. The disclosure has no particular limitation thereto.

Also, in one embodiment, a width W1 of the hook 214 (extended along the side of the rear plate in the X-direction; please also referred to FIG. 10A and FIG. 11) is in a range from 3 mm to 15 mm (3 mm≤W1≤15 mm). The second positioning element such as the hook 214 has a length L1 in a range from 0.2 mm to 0.8 mm (0.2 mm≤L1≤0.8 mm) (the length L1 denotes as a protruding portion of the hook 214, which has to be matched with the size of the accommodating hole 31; please also referred to FIG. 7B). The length L1 of the hook 214 is related to the thickness of the rear plate 132 in the application for completing the engagement between the hook 214 and the accommodating hole 31. In another embodiment, the thickness of the rear plate 132 in the application is 1T, the length L1 of the hook 214 is in a range from 0.2 mm to 20 mm (0.2 mm≤L1≤20 mm). Moreover, in one embodiment, the width W2 of the tongue plate 212 (extended along the side of the rear plate in the X-direction; please also referred to FIG. 10A and FIG. 11) is in a range from 5 mm to 20 mm (5 mm≤W2≤20 mm). The connecting portion 212C of the tongue plate 212 has a length L3 (i.e. the length in the direction vertical to the side of the rear plate) in a range from 0.5 mm to 50 mm (0.5 mm≤L3≤50 mm). The sum of the length of the baffle portion 212B and the length of the guiding portion 212G can be determined as the length L2 (i.e. the length parallel to an extending direction of the side of the rear plate) of the tongue plate 212. In one embodiment, the tongue plate 212 has a length L2 in a range from 0.5 mm to 50 mm (0.5 mm≤L2≤50 mm). An overall length of the tongue plate 212 is the sum of the lengths L2 and L3, which includes the lengths of the connecting portion 212C, the baffle portion 212B and the guiding portion 212G (please see FIG. 10A and FIG. 11). The length L2 of the tongue plate 212 (i.e. the length of the baffle portion 212B plus the length of the guiding portion 212G) is determined according to the height of the side 132e of the rear plate in the Z-direction, and the height of the side 132e of the rear plate is related to the thicknesses of the modules (e.g. the thickness of the backlight module and the thickness of the display panel) in the Z-direction. Thus, the length L2 of the tongue plate 212 depends on the thicknesses of the modules. It is noted that the numerical values of the widths and the lengths, such as widths W1 and W2 and the lengths L1, L2 and L3 as described above, are provided for illustration, not for limiting the applications of the present disclosure.

Additionally, in one embodiment, the base 210, the tongue plate 212 and the hook 214 of the engaging structure 21 are integrally formed, such as integrated as one plastic or metal piece. The material of the frame 131 can be plastic or metal. In an example of using a metal material, the engaging structure 21 made of metal is welded to the interior of the frame, the thickness of the engaging structure 21 made of metal is in (but not limited to) a range from 0.2 mm to 0.4 mm (0.2 mm≤thickness of the engaging structure≤0.4 mm), and the thickness of the frame 131 made of metal is in (but not limited to) a range from 0.5 mm to 2 mm (0.5 mm≤thickness of the frame≤2 mm). In an example of using a plastic material, the engaging structure 21 made of plastic has a thickness in (but not limited to) a range from 1.5 mm to 2 mm (1.5 mm≤thickness of the engaging structure≤2 mm), and the thickness of the frame 131 made of plastic is in (but not limited to) a range from 1 mm to 1.5 mm (1 mm≤thickness of the frame s 1.5 mm). However, the disclosure has no particular limitation for the materials of the engaging structure and/or the frame. Also, although the elements (such as each of the base, 210, the tongue plate 212 and the hook 214) of the engaging structure 21 according to one embodiment can be integrated as one-piece structure, the disclosure is not limited thereto. The tongue plate 212 and the hook 214 can be disposed independently at the inner side of the frame. Therefore, in other embodiment, the base can be omitted from the engaging structure, wherein the tongue plate and the hook are directly formed at the inner side of the frame, for completing assembly of the frame and the rear plate. Thus, the descriptions of the embodiments above and the components shown in the drawings related to the embodiments are provided for illustration, the disclosure is not limited to the components/configurations of the embodiments.

Moreover, the display device according to the embodiment of the disclosure can be a flat display device or a curved display device. Although the drawings of the embodiment are related to a flat display device, the disclosure can be applied to a curved display device of another embodiment. The disclosure has no particular limitation thereto.

According to the aforementioned descriptions, the display device having several assembling modules of the embodiment is provided, wherein the engaging structures 21 are positioned at the interior of the frame, and it does not affect the appearance of the frame. Also, the engaging structure 21 includes a base, a first positioning element and a second positioning element disposed on the base, thereby restricting the movements of the frame along the X-direction, the Y-direction and the Z-direction. In one example, the engaging structure 21 includes the hook 214 for engagement and the tongue plate 212 for preventing the structure turning outward and detaching. Thus, the design of the assembling modules of the embodiment not only possesses the engaging function but also presents the good appearance. The design of the embodiment is particularly suitable for being applied to the applications of front frame assembly for ultra-narrow bezel models. In one embodiment, the end of the first positioning element (such as the tongue plate 212) of the engaging structure 21 may further have a folding structure (such as a guiding portion 212G) for guiding the frame to be assembled with the rear plate, thereby improving the assembly and preventing the debris produced from unnecessary scratching, and also having position-restricting function to avoid the hook 214 loosening by force. Additionally, in one embodiment, a guiding structure (e.g. the guiding structure 314G) can be further formed at the rear plate and positioned above the accommodating hole 31 correspondingly, thereby optimizing assembly, reducing the difficulty of assembly and preventing the deformations of the related components. Moreover, the design of the assembling modules of the embodiment facilitates the engaging structure at the frame detaching from the rear plate. Therefore, the design of the embodiment facilitates the display device in the application to be disassembled for inspection (e.g. before leaving the factory) or for maintenance (e.g. after an end user uses the product over a period of time and sends it back to overhaul). Accordingly, the design of the assembling modules of the embodiment adopting screw-free connecting way for the frame has advantages of well fixation and good appearance of the display device in the application. Also, the steps of assembly and disassembly are simple, so that the design is suitable for being applied to the products in mass production.

Structural details of the aforementioned embodiments are provided for exemplification only, not for limitation. Other embodiments with different configurations, such as change on components of the related layers and the displaying elements to meet practical requirements can be applicable. It is known by people skilled in the art that the configuration details, such as shapes and positions of the related components/layers, could be adjusted according to the requirements and/or manufacturing steps of the practical applications.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A display device, comprising:
a display panel, a backlight module and a housing, the display panel and the backlight module disposed in an accommodating space of the housing, the housing comprising a frame, a rear plate and a plurality of assembling modules, wherein an inner surface of the frame is assembled with an outer surface of a side of the rear plate through one of the plurality of assembling modules to create the accommodating space, and one of the plurality of assembling modules comprises:

an engaging structure disposed on the inner surface of the frame, and the engaging structure comprising a base, a first positioning element, and a second positioning element, wherein the first positioning element comprises a connecting portion, a guiding portion, and a baffle portion disposed therebetween, and the guiding portion is bent toward the accommodating space; and an accommodating hole and a guiding structure disposed at the side of the rear plate, the accommodating hole disposed correspondingly to the second positioning element of the engaging structure for engaging, the guiding structure bent toward the accommodating space, and the guiding structure disposed correspondingly to the accommodating hole for guiding the second positioning element to the accommodating hole.

2. The display device according to claim 1, wherein two ends of the connecting portion respectively connect the base and the baffle portion, and two ends of the baffle portion respectively connect the connecting portion and the guiding portion.

3. The display device according to claim 1, wherein an angle exists between the guiding portion and an extending plane of the baffle portion is in a range from 20 degrees to 45 degrees.

4. The display device according to claim 1, wherein an angle exists between the baffle portion and the connecting portion is in a range from 65 degrees to 160 degrees.

5. The display device according to claim 1, wherein an angle exists between the baffle portion and the connecting portion is in a range from 65 degrees to 85 degrees.

6. The display device according to claim 1, wherein an angle exists between the baffle portion and the connecting portion is in a range from 95 degrees to 160 degrees.

7. The display device according to claim 1, wherein the shape of the first positioning element is different from the shape of the second positioning element.

8. The display device according to claim 1, wherein an angle exists between the guiding structure and an extending plane of the side of the rear plate is in a range from 30 degrees to 45 degrees.

9. The display device according to claim 1, wherein the first positioning element has a first center point, the second positioning element has a second center point, and a shortest distance between the first center point and the second center point is in a range from 15 mm to 70 mm.

10. The display device according to claim 1, wherein a width of the second positioning element along an extending direction of the side of the rear plate is in a range from 3 mm to 15 mm.

11. The display device according to claim 1, wherein the second positioning element is protruded from the base, and the second positioning element has a length in a range from 0.2 mm to 0.8 mm.

12. The display device according to claim 1, wherein a width of the first positioning element along an extending direction of the side of the rear plate is in a range from 5 mm to 20 mm.

13. The display device according to claim 1, wherein a length of the first positioning element along an extending direction of the side of the rear plate is in a range from 0.5 mm to 50 mm.

14. The display device according to claim 1, wherein the base, the first positioning element and the second positioning element of the engaging structure are integrally formed.

15. An engaging structure for assembling a frame with a rear plate to create a accommodating space to containing a display panel and a backlight module therein, the engaging structure comprising:

a base disposed on the inner surface of the frame;

a first positioning element connecting to the base; and a second positioning element connecting to the base disposed on the inner surface of the frame;

wherein the first positioning element comprises a connecting portion, a guiding portion, and a baffle portion disposed therebetween, the guiding portion is bent outward the base, and the base, the connecting portion and the baffle portion create a space for accommodating the side of the rear plate.

16. The engaging structure according to claim 15, wherein an angle existing between the guiding portion and an extending plane of the baffle portion is in a range from 20 degrees to 45 degrees.

17. The engaging structure according to claim 15, wherein an angle existing between the baffle portion and the connecting portion is in a range from 65 degrees to 160 degrees.

18. The engaging structure according to claim 15, wherein the first positioning element has a first center point, the second positioning element has a second center point, and a shortest distance between the first center point and the second center point is in a range from 15 mm to 70 mm.

19. The engaging structure according to claim 15, wherein a width of the second positioning element along an extending direction of the side of the rear plate is in a range from 3 mm to 15 mm.

* * * * *